Dec. 7, 1971　　　　A. E. GORDON　　　　3,624,952
HUMANE ANIMAL TRAP
Filed May 14, 1970　　　　　　　　　　　　　3 Sheets-Sheet 3
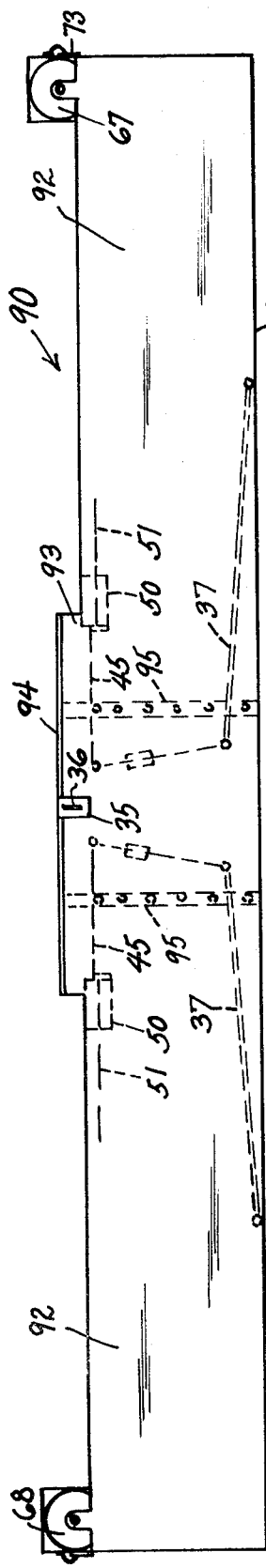
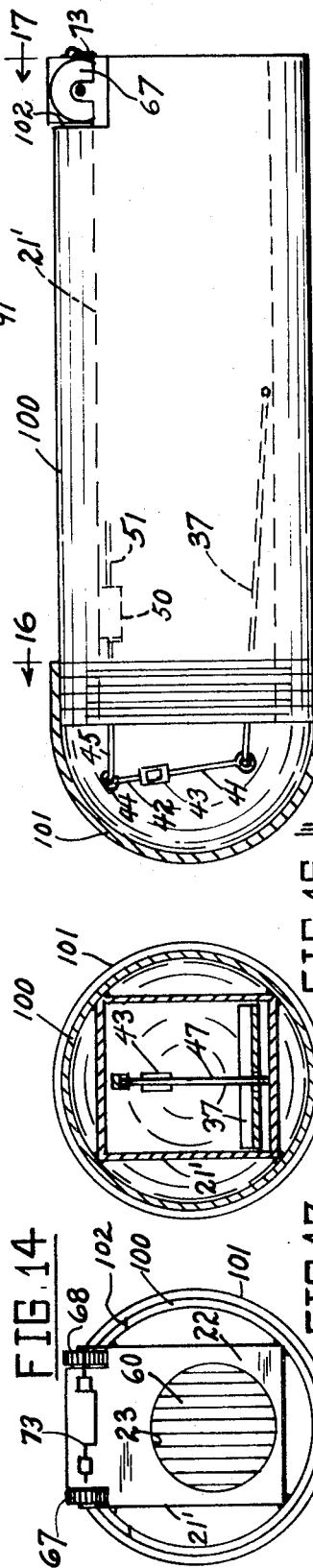
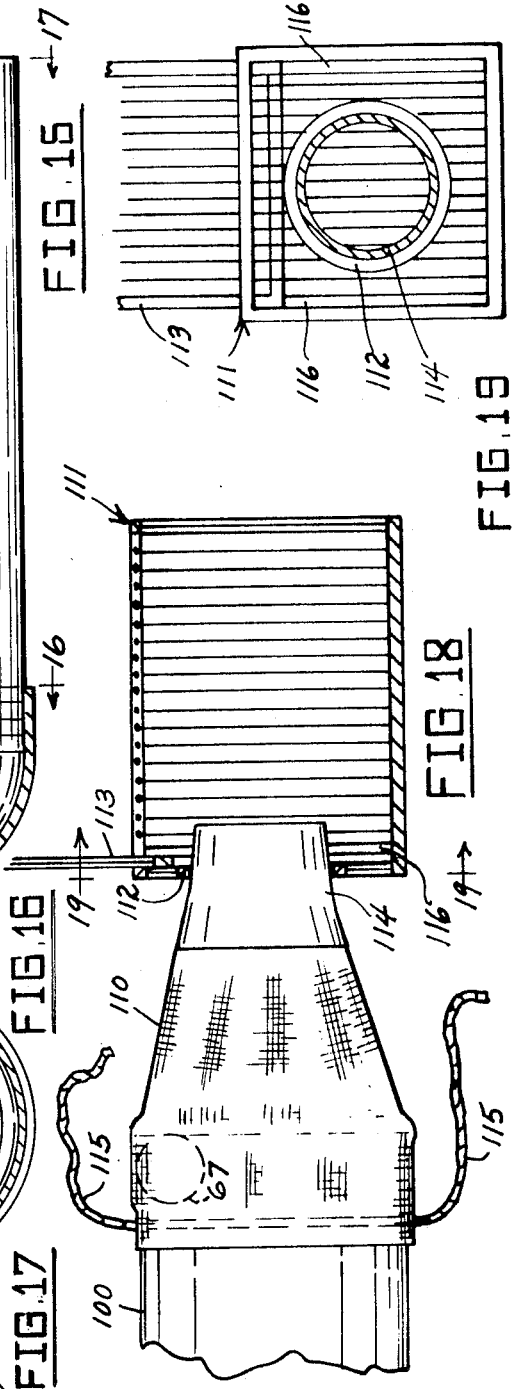
INVENTOR
ARTHUR E. GORDON
BY Herman L Gordon
ATTORNEY

United States Patent Office 3,624,952
Patented Dec. 7, 1971

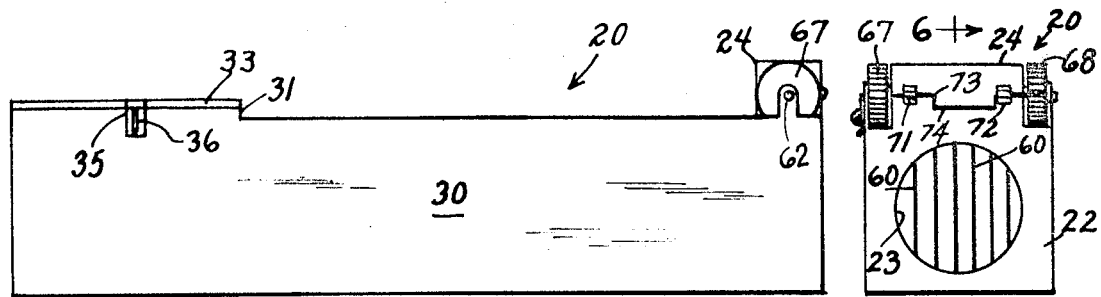
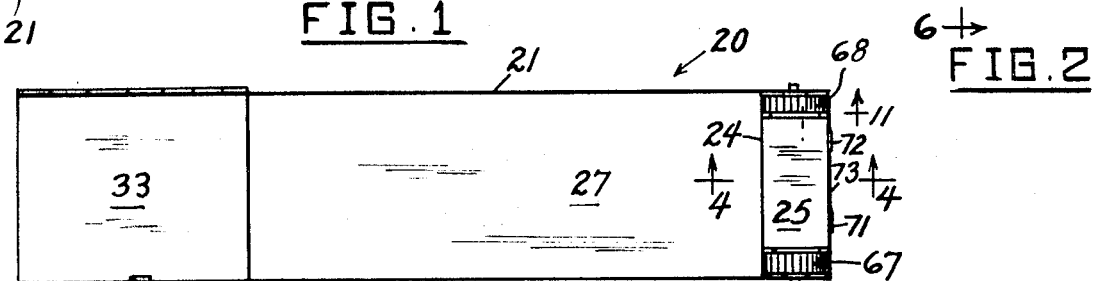
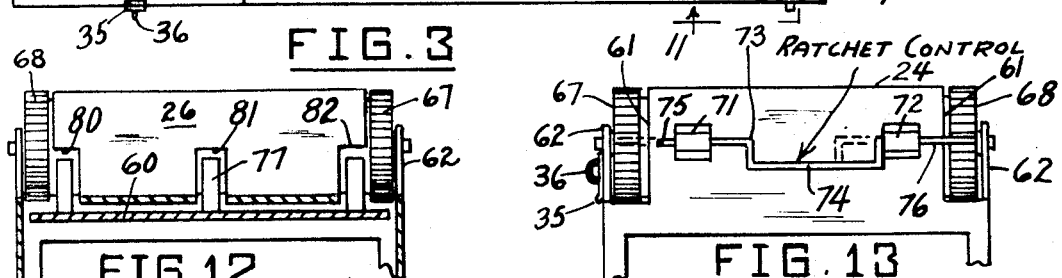
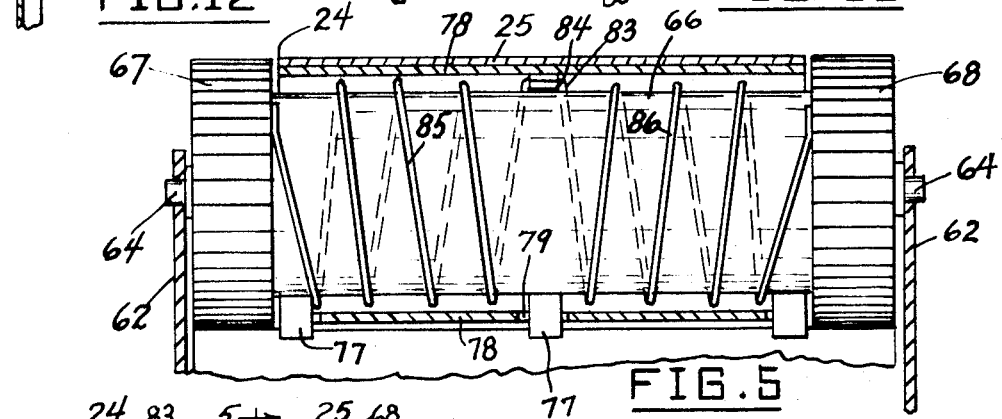
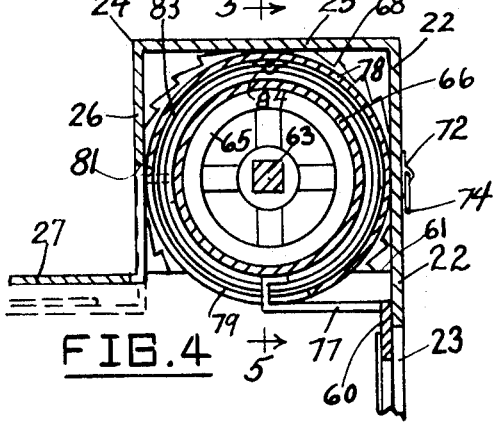
INVENTOR
ARTHUR E. GORDON
BY Herman L. Gordon
ATTORNEY

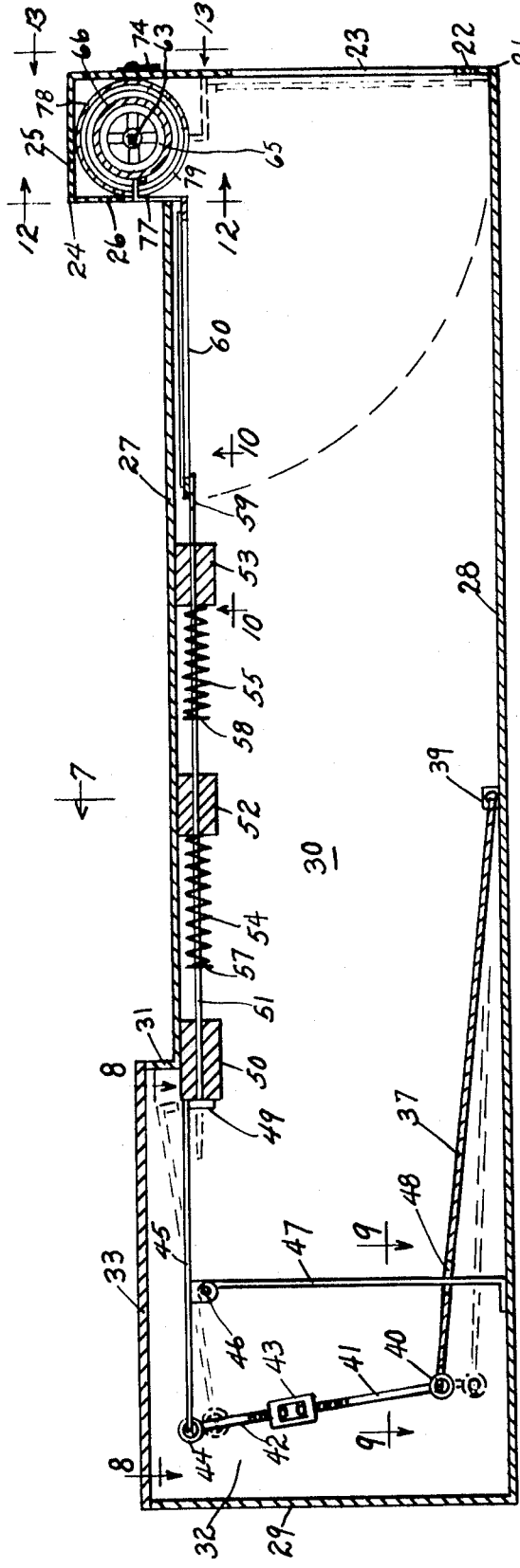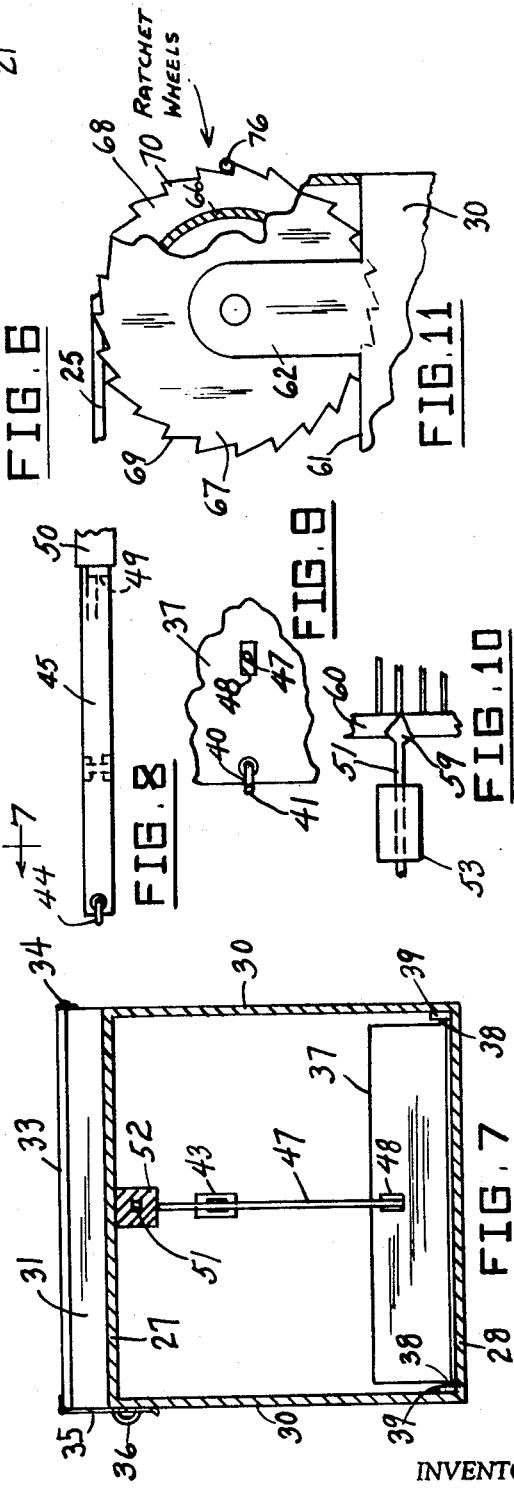

3,624,952
HUMANE ANIMAL TRAP
Arthur E. Gordon, Box 1, Baker, Calif. 92309 (Apt. 1, Villa Motel, 902 Data St., Truth or Consequences, N. Mex. 87901)
Filed May 14, 1970, Ser. No. 37,143
Int. Cl. A01m 23/20
U.S. Cl. 43—61                                10 Claims

ABSTRACT OF THE DISCLOSURE

An animal trap having a spring-actuated hinged trap door and a treadle-operated interior door-releasing trigger mechanism. The hinged trap door is provided with a reversible ratchet mechanism for holding the door open while the trigger mechanism is being set and for latching the door closed after release by the trigger mechanism.

This invention relates animal traps, and more particularly to an animal trap of the internal treadle-actuated type.

A main object of the invention is to provide a novel and improved animal trap which is relatively simple in construction, which is easy to set, and which causes no injury or discomfort to animals entrapped therein.

A further object of the invention is to provide an improved animal trap especially suited for trapping mink and similar animals, the trap being inexpensive to manufacture, being durable in construction, being easy to camouflage and being safe to use.

A still further object of the invention is to provide an improved animal trap of the type having a trap door which is released by the operation of an internal treadle element in the trap, permitting the entrapment of animals without causing the injury or discomfort, the trap being provided with an improved reversible ratchet mechanism enabling the trap door to be held open while the triggering mechanism for the door is being set after the trap is baited, and for latching the door in closed position after the trap has been sprung, the ratchet mechanism being easily accessible to the trapper for the operation thereof, and being reliable in operation.

A still further object of the invention is to provide an improved animal trap device with highly efficient means to transfer an animal caught therein to a receiving cage or receptacle with minimum risk to the trapper and without injury to the animal, the device being easy to manipulate and permitting safe and rapid transfer of the animal.

A still further object of the invention is to provide an improved animal trapping device which is convenient to use, which is relatively compact in size so that it can be easily transported and stored, which traps animals without causing them any injury or pain, which protects entrapped animals from birds of prey or other predators, which aids in conservation by providing a choice of freeing trapped female animals or keeping them for breeding purposes, and wherein substantially all the operating parts are contained within the housing of the device, whereby said parts are protected from the weather and whereby accidental triggering of the device is substantially prevented.

Further objects and advantages of the invention will become apparent from the following description and claims and from the accompanying drawings, wherein:

FIG. 1 is a side elevational view of a typical animal trap constructed in accordance with the present invention.

FIG. 2 is an end elevational view of the trap of FIG. 1, with the trap door in closed position.

FIG. 3 is a top plan view of the animal trap of FIGS. 1 and 2.

FIG. 4 is an enlarged fragmentary vertical cross-sectional view taken substantially on line 4—4 of FIG. 3.

FIG. 5 is a transverse vertical cross-sectional view taken substantially on the line 5—5 of FIG. 4.

FIG. 6 is a longitudinal cross-sectional view taken substantially on the line 6—6 of FIG. 2, but showing the trap door in open position and with its associated triggering mechanism set for operation.

FIG. 7 is a transverse vertical cross-sectional view taken substantially on line 7—7 of FIG. 6.

FIG. 8 is a fragmentary horizontal detail view taken substantially on line 8—8 of FIG. 6.

FIG. 9 is a fragmentary horizontal cross-sectional detail view taken substantially on line 9—9 of FIG. 6.

FIG. 10 is a fragmentary bottom plan detail view taken substantially on line 10—10 of FIG. 6.

FIG. 11 is an enlarged fragmentary vertical cross-sectional view taken substantially on line 11—11 of FIG. 3.

FIG. 12 is a fragmentary transverse vertical cross-sectional view taken substantially on line 12—12 of FIG. 6.

FIG. 13 is a fragmentary end elevational view taken substantially on the line 13—13 of FIG. 6.

FIG. 14 is a side elevational view of a double animal trap constructed in accordance with the present invention.

FIG. 15 is a side elevational view, partly in vertical cross-section, of a modified form of single animal trap according to the present invention.

FIG. 16 is a transverse vertical cross-sectional view taken substantially on line 16—16 of FIG. 15.

FIG. 17 is an end elevational view taken substantially on line 17—17 of FIG. 15.

FIG. 18 is a fragmentary longitudinal vertical cross-sectional view illustrating a transfer device according to the present invention employed with an animal trap for conveying a trapped animal into a receiving cage.

FIG. 19 is a fragmentary transverse vertical cross-sectional view taken substantially on line 19—19 of FIG. 18.

Referring to the drawings, and more particularly to FIGS. 1 to 13, 20 generally designates a typical animal trap constructed in accordance with the principles of the present invention. The trap 20 comprises an elongated housing 21 of any suitable cross-sectional shape, for example, rectangular as illustrated. The housing has a front end wall 22 which is provided with a circular entrance aperture or doorway 23. Adjacent its front end, the housing is formed with a transversely extending substantially rectangular upstanding auxiliary housing portion 24 having a top wall 25 and a rear transverse wall 26. The upper portion of front end wall 22 forms the front wall of said auxiliary housing portion 24.

Main housing 21 has a top wall 27, a bottom wall 28, a rear end wall 29, and longitudinal vertical side walls 30, 30. Top wall 27 has a transverse vertical upstanding rear portion 31, and the side and rear walls of the main housing are correspondingly shaped, to define a rear housing space 32 for baiting and setting the trap, as will be presently described. Space 32 is provided with a hinged top cover 33. For example, top cover 33 is hinged at 34 to the top marginal portion of the upstanding rear portion of one of the longitudinal side walls 30. The top cover 33 is provided at its opposite marginal portion with a hinged hasp 35 which is slotted to receive a U-shaped loop member 36 provided on the adjacent side wall 30, permitting the top cover to be locked in closed position by the use of a conventional padlock.

Designated at 37 is a generally rectangular plate-like treadle member which is located in the rear portion of housing 21, extending into the space 32. The forward margin of treadle member 37 is hinged in any suitable manner to the floor of housing 21 for rotation on a transverse axis. For example, the forward corners of member 37 may be provided with hinge pins or lugs 38, 38 which are rotatably engaged in upstanding apertured lugs 39, 39, secured to the bottom margins of side walls 30, 30 in transverse alignment. Pivotally connected at 40 to the rear margin of member 37 is a link rod 41 which is adjustably connected by a turnbuckle 43 to another link rod 42. The top end of rod 42 is pivotally connected at 44 to the rear end of a trigger arm 45. Arm 45 is pivotally connected at 46 to and supported on the top end of an upstanding post member 47 rigidly secured to bottom wall 28. Post member 47 extends through a clearance slot 48 provided therefor in the plate-like treadle member 37.

The forward end of trigger arm 45 is provided with a depending friction catch lug 49 which is rotatable to a position adjacent the rear end of a guide block 50 secured to housing top wall 27 subjacent to and projecting rearwardly beneath the upstanding transverse top wall portion 31. This position of lug 49 is shown in full line view in FIG. 6. In this position, lug 49 is engageable by the rear end of a longitudinal trigger rod 51 slidably supported in aligned longitudinal bores provided in block 50 and in a pair of additional guide blocks 52 and 53 secured to and depending from top wall 27 and spaced forwardly from block 50, as shown in FIG. 6. Rod 51 is biased rearwardly by coiled springs 54 and 55 surrounding rod 51 and bearing between respective washers 57, 58 secured on rod 51 and the guide blocks 52, 53.

The rearward biasing force exerted by springs 54, 55 on rod 51 is sufficient to support treadle member 37 and bait carried thereby in an elevated position by the frictional force exerted on lug 49 by the rear end of rod 51. When an animal steps on the treadle member 37, the treadle member is depressed to the dotted position thereof shown in FIG. 6, causing arm 45 to be rotated counterclockwise, as viewed in FIG. 6, thereby elevating lug 49 so that it slips above rod 51 and allows the rod to rapidly move rearwardly by the expansion of springs 54, 55.

The forward end of rod 51 is provided with a flat detent head 59. Rod 51 and its supporting bores in blocks 50, 52 and 53 are preferably non-circular in cross-section so that the rod 51 cannot rotate and flat head 59 is retained in a horizontal position. As shown in FIG. 6, head 59 is engageable beneath the marginal portion of a hinged trap door 60 to hold the trap door in a rearwardly-swung open horizontal position. When rod 51 is released in the manner above described, head 59 is rapidly retracted from beneath the margin of trap door 60 and allows the door to swing shut.

The auxiliary housing portion 24 has rectangular opposite notched-away end portions 61, 61, and the longitudinal side walls 30, 30 are formed with upstanding vertical support lugs 62, 62 adjacent the notches 61, 61. A transverse square shaft 63 has opposite cylindrical end studs 64, 64 journalled in the top portions of lugs 62, 62. Rigidly secured on shaft 63 are a plurality of spaced spider members 65, and rigidly secured on said spider members 65 is a transverse cylindrical shell member 66 which is thus rigidly and coaxially mounted on shaft 63. Rigidly secured to the opposite ends of shell member 66 coaxially therewith are respective ratchet wheels 67 and 68, which are thus rotatably supported in the notches 61, 61. As shown in FIG. 5, the ratchet wheels 67, 68 are substantially enlarged in diameter as compared with shell member 66 so as to be easily accessible for manual rotation.

As shown in FIG. 11, the ratchet wheels 67 and 68 have ratchet teeth 69, 70 respectively facing in opposite directions. Slidably supported in transversely aligned brackets 71 and 72 mounted on the upper portion of end wall 22 is a resilient wire pawl rod 73 having a U-shaped depending intermediate stop portion 74 located between brackets 71 and 72. The pawl rod has opposite resilient end portions 75 and 76 which are selectively engageable with the respective ratchet wheel 67 and 68, depending upon the position of pawl rod 73. For example, in the position shown in FIG. 13, stop portion 74 abuts the right bracket 72 and the right resilient pawl element 76 is in operative engagement with the right ratchet wheel 68. As shown in FIG. 11, this allows shell member 66 to be rotated in a clockwise direction and prevents counterclockwise rotation thereof. Conversely, when the pawl rod 73 is shifted to the left so that stop portion 74 abuts the left bracket 71, the left resilient pawl element 75 is in operative engagement with the left ratchet wheel 67 and right ratchet wheel 68 is released. This allows the shell member 66 to be rotated in a counterclockwise direction, as viewed in FIG. 11, and prevents clockwise rotation thereof.

As shown in FIG. 4, the trap door 60 is secured to and is supported by the rotary shell member 66 by a plurality of spaced generally L-shaped offset bracket lugs 77 which are shaped so that in one position of shell member 66, for example, that shown in full line view in FIG. 4, the door 60 is supported in vertical position inwardly adjacent wall 22 and covering the doorway 23. When shell member 66 is rotated approximately 90° clockwise from this position to the dotted view position of the door 60 shown in FIG. 4, the door is in the open substantially horizontal position illustrated in full line view in FIG. 6.

Secured rigidly in the auxiliary housing portion 24 surrounding and coaxial with shell member 66 is a stationary outer shell member 78, which is provided with a suitable set of spaced clearance slots 79 for the L-shaped offset bracket lugs 77, as shown in FIG. 4. The rear wall 26 of the auxiliary housing portion 24 is similarly provided with clearance notches or apertures 80, 81 and 82 for said bracket lugs 77, as shown in FIG. 12.

A double-wound torsion spring 83 has its center portion secured to the interior mid-portion of fixed shell 78 by a bracket 84, as shown in FIG. 5, and has reversely pitched side portions 85 and 86 surrounding shell member 66 and secured at their ends to the respective ratchet wheels 67 and 68. Torsion spring 83 biases door 60 in a counterclockwise direction, as viewed in FIG. 4, namely, toward its closed position. With the pawl rod 73 in the position of FIGS. 2 and 13, namely, with rod element 76 engaging ratchet wheel 68, the door 60 may be manually rotated in a clockwise direction from the closed full-line position of FIG. 4 to the horizontal open dotted-view position thereof, and counterclockwise rotation thereof will be prevented by the cooperating ratchet action of pawl rod element 76 and ratchet wheel 68. Thus, the door may be held in its horizontal open position, shown in FIG. 6, while the trap is being baited and its trigger mechanism is being reset.

In operating the trap, door 60 is first manually swung to the open position of FIG. 6. This may be done by adjusting pawl rod 73 to the full-line position of FIG. 13 and rotating the door clockwise, as viewed in FIG. 6, employing one or the other, or both of the ratchet wheels as knobs. The door will then be held in the open position of FIG. 6 by the ratchet cooperation of pawl rod element 76 with ratchet wheel 68.

With cover 33 open, access is provided to the space 32. Suitable bait may be placed on the treadle member 37. Trigger rod 51 is manually pushed forwardly against the tensioning action of springs 54 and 55 to position detent head 59 beneath the adjacent margin of door 60 and trigger arm 45 is rotated clockwise, as viewed in FIG. 6, from its dotted view position towards its full-line position to lower lug 49 into a position wherein it is engageable by the rear end of rod 51. With rod 51 released, lug 49 is therefore frictionally held in the position shown in full-line view in FIG. 6. Cover 33 is then closed and locked. Pawl rod 73 is then shifted leftwards as viewed in FIG. 13, from its full-line position to its dotted view position, which releases ratchet wheel 68 but moves pawl rod element 75 into ratchet cooperation with the reverse ratchet wheel 67. The trap is now set for operation.

When an animal, attracted by the bait, enters the trap through doorway 23 and steps on the treadle member 37, the downward force exerted by the animal on the treadle member depresses said member and rotates trigger rod 45 counterclockwise, as viewed in FIG. 6, disengaging lug 49 from the rear end of trigger rod 51 and allowing springs 54 and 55 to expand and retract the detent head from beneath the margin of door 60. This releases the door and it is rapidly swung to its closed position by the unwinding of spring 83. The door is held in its closed position, shown in FIG. 4, by the ratchet cooperation between pawl rod element 75 and ratchet wheel 67.

To remove the trapped animal, the door is opened in the manner above described and the animal is conveyed to a suitable receptacle, such as a receiving cage, in a manner presently to be described.

FIG. 14 illusrates a double trap employing the same principles as the single trap of FIGS. 1 to 13. The double trap, designated generally at 90, comprises an elongated housing 91, with oppositely opening single trap compartments 92, 92 and a common intermediate baiting and setting section 93 provided with the hinged access top cover 94. The respective trap compartments are segregated from each other by the provision of respective transverse barrier partition grating 95, 95 in their inner end portion, located in the intermediate housing section 93 and spaced sufficiently inwardly therein to allow access to the inner end portions of the respective trap compartments for individually baiting and setting the respective single traps.

FIGS. 15 to 17 illustrate another embodiment of the present invention wherein the trap, generally similar to that illustrated in FIGS. 1 to 13, has a main inner housing 21', open at its rear end, which is secured in an elongated cylindrical outer housing 100 provided with a screw-threaded generally hemispherical removable back cover 101 for providing access to the rear end portion of the trap for baiting and setting the trap. The forward end of outer housing 100 is open and exposes the front wall 22 and the circular doorway 23. The ratchet wheels 67 and 68 are likewise exposed through a notch 102 provided at the forward end of outer housing 100.

Outer housing 100 may be suitably colored or otherwise camouflaged to blend with the environment in which the trap is to be used. Any other suitable camouflage cover means may be employed with traps according to the present invention.

A trap such as that illustrated in FIGS. 15 to 17 is especially suitable for placement in a hollow log or any other elongated passage or runway through which animals are likely to pass.

FIGS. 18 and 19 illustrate the use of a flexible transfer conduit 110 for safely transferring a trapped animal from a trap to a receiving cage 111. The receiving cage 111 has a circular doorway 112 and a vertically slidable closure grating 113 located inwardly adjacent the doorway 112 and constrained to move vertically between said doorway and a pair of fixed vertical guide ribs 116, 116 provided at the opposite sides of the cage. The transfer conduit 110 comprises a tubular main body of fabric or other suitable flexible material which is convergent in shape and which is connected at its smaller end to a convergent rigid metal or plastic nozzle portion 114 adapted to be snugly received in the circular doorway 112 in the manner illustrated in FIG. 18, with the smaller end portion thereof projecting into cage 111. The larger end of the flexible main body is adapted to receive the forward end portion of a trap, and is provided with flexible fastening cord elements 115, 115 which can be suitably tied together around the transfer conduit for fastening the larger end of the transfer conduit to the trap received therein. The fabric or similar flexible material is sufficiently soft and pliable to permit the necessary manipulation of ratchet wheel 67 through the material to rotate trap door 60 from its closed position to its open position. Thus, with an animal caught in the trap, pawl rod 73 is adjusted to the position of FIGS. 2 and 13, which will permit door 60 to be subsequently rotated to its open position. The larger end of the transfer conduit 110 is engaged around and tied to the forward end portion of the trap, as in FIG. 18, and the rigid nozzle portion 114 is inserted into the circular doorway 112 of the receiving cage 111, with the sliding closure grating 113 elevated as shown. Ratchet wheel 67 is then manually rotated, through the flexible material, in a clockwise direction, as previously described, to rotate door 60 to its open position and to thereby allow the animal to pass into the receiving cage. After the animal has entered the receiving cage, nozzle portion 114 is carefully disengaged from doorway 112 and closure grating 113 is lowered so as to cover said doorway.

The transfer conduit assembly 110 may be employed with equal facility with any one of the various embodiments of the animal trap described herein.

It is to be particularly noted that a trap such as that illustrated in FIGS. 15 to 17, namely, provided with a durable outer cover of circlar cross-section, such as outer housing 100, defines air spaces around the main inner housing 21' which provides ventilation allowing a trapped animal to breathe. This type of trap is therefore especially suited for placement underground.

While certain specific embodiments of an improved animal trap apparatus have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. An animal trap comprising an elongated main housing having a substantially closed off interior space and provided at an end thereof with a doorway, a trap door transversely hinged in said end of the housing and being swingable to a substantially vertical closed position covering said doorway and to a substantially horizontal position leaving the doorway open, a detent element movably mounted in the housing and being engageable beneath the door to at times hold the door in said horizontal position, means biasing the door toward said vertical closed position, means biasing said detent element away from the door toward a disengaged position, a treadle member in said interior space pivoted to the bottom portion of said housing, a trigger lever pivoted in said housing and having a holding portion engageable with said detent element to maintain the detent element beneath the door when the door is in said horizontal position, means operatively connecting said lever to said treadle member, whereby to disengage said holding portion from said detent element responsive to depression of said treadle member, and reversible manually settable cooperating ratchet means on the housing and the door, whereby to selectively limit the permissible direction or rotation of the door and whereby the door can be held open during the baiting and setting of the trap.

2. The animal trap of claim 1, and wherein the housing is provided with closure means adjacent said interior space, said closure means being capable of being opened to provide access to said interior space for baiting and setting the trap.

3. The animal trap of claim 2, and wherein the door is hinged on a transverse axis located adjacent and above said doorway and offset relative to the plane of the door.

4. The animal trap of claim 3, and wherein the door is provided with a marginal hinge member journalled to the housing and said ratchet means includes a pair of spaced ratchet wheels on said hinge member, said ratchet wheels having oppositely pitched teeth, and a pawl element movably connected to the housing and being selectively engageable with the ratchet wheels.

5. The animal trap of claim 4, and wherein said detent element comprises a longitudinal rod slidably mounted in the housing subjacent its top wall and having a front head portion engageable beneath the margin of the door, the holding portion of the trigger lever comprising a depending lug of the lever engageable with the rear end of said longitudinal rod.

6. The animal trap of claim 5, and wherein said hinge member comprises a cylindrical body secured to the door and having axial opposite shaft end elements, said housing having transversely aligned bearing members on its side walls rotatably receiving said shaft end elements.

7. The animal trap of claim 6, and wherein the means biasing the door toward said vertical position comprises a torsion spring surrounding said cylindrical body and connected between the body and the housing.

8. The animal trap of claim 7, and wherein said closure means comprises a hinged lid on the top of the housing.

9. The animal trap of claim 7, and wherein said closure means comprises a screw threaded cover cap on the end of the housing opposite said doorway.

10. The animal trap of claim 4, and a transfer conduit having a main tubular duct portion of flexible material receiving and secured around the end of the housing, including the ratchet wheels, whereby at least one of the ratchet wheels is manually rotatable through the flexible material, and a ragid nozzle portion connected to said duct portion and being insertable into the doorway of a receiving cage for conveying an animal from the trap to said receiving cage.

References Cited
UNITED STATES PATENTS

| | | | |
|---|---|---|---|
| 1,305,054 | 5/1919 | Blevins | 43—61 |
| 2,562,809 | 7/1951 | Mogren | 43—61 |
| 2,692,453 | 10/1954 | Wingfield | 43—61 |
| 2,741,062 | 4/1956 | Johnston | 43—61 |

HUGH R. CHAMBLEE, Primary Examiner